United States Patent
Isele

(10) Patent No.: US 11,242,054 B2
(45) Date of Patent: Feb. 8, 2022

(54) AUTONOMOUS VEHICLE INTERACTIVE DECISION MAKING

(71) Applicant: Honda Motor Co., Ltd., Tokyo (JP)

(72) Inventor: David Francis Isele, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 16/439,682

(22) Filed: Jun. 12, 2019

(65) Prior Publication Data

US 2020/0391738 A1 Dec. 17, 2020

(51) Int. Cl.
| | |
|---|---|
| *B60W 30/16* | (2020.01) |
| *B60W 30/18* | (2012.01) |
| *G08G 1/16* | (2006.01) |
| *B60W 30/09* | (2012.01) |
| *B60W 50/08* | (2020.01) |
| *B60W 30/095* | (2012.01) |

(52) U.S. Cl.
CPC ............ *B60W 30/16* (2013.01); *B60W 30/09* (2013.01); *B60W 30/0956* (2013.01); *B60W 30/18163* (2013.01); *B60W 50/085* (2013.01); *G08G 1/167* (2013.01)

(58) Field of Classification Search
CPC ........... B60W 30/16; B60W 30/18163; B60W 30/09; B60W 50/085; B60W 30/0956; B60W 60/00276; G08G 1/167
See application file for complete search history.

(56) References Cited

U.S. PATENT DOCUMENTS

| | | | | |
|---|---|---|---|---|
| 9,177,477 | B2* | 11/2015 | Mochizuki | G08G 1/162 |
| 10,081,357 | B2* | 9/2018 | Saigusa | B60W 30/095 |
| 10,414,395 | B1* | 9/2019 | Sapp | G01S 13/00 |
| 10,766,493 | B2* | 9/2020 | Buburuzan | B62D 15/0255 |

(Continued)

OTHER PUBLICATIONS

Wikipedia Bayesian probability (Year: 2011).*

(Continued)

*Primary Examiner* — Jeff A Burke
*Assistant Examiner* — Kyle T Johnson
(74) *Attorney, Agent, or Firm* — Rankin, Hill & Clark LLP

(57) ABSTRACT

Autonomous vehicle interactive decision making may include identifying two or more traffic participants and gaps between the traffic participants, selecting a gap and identifying a traffic participant based on a coarse probability of a successful merge between the autonomous vehicle and a corresponding traffic participant, generating an intention prediction associated with the identified traffic participant based on vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle, generating an intention prediction associated with the autonomous vehicle, calculating an updated probability of a successful interaction between the identified traffic participant and the autonomous vehicle based on the intention prediction associated with the identified traffic participant and the autonomous vehicle.

14 Claims, 7 Drawing Sheets

(56) References Cited

U.S. PATENT DOCUMENTS

| | | | | |
|---|---|---|---|---|
| 2013/0222127 | A1* | 8/2013 | Ray Avalani | G08G 1/167 340/436 |
| 2017/0031361 | A1* | 2/2017 | Olson | G08G 1/167 |
| 2018/0043897 | A1* | 2/2018 | Hashimoto | G08G 1/166 |
| 2018/0170388 | A1* | 6/2018 | Shin | B60W 30/18163 |
| 2018/0240345 | A1* | 8/2018 | So | B60W 30/08 |
| 2019/0025853 | A1* | 1/2019 | Julian | G05D 1/0274 |
| 2019/0354105 | A1* | 11/2019 | Cunningham | G05D 1/0212 |
| 2019/0377354 | A1* | 12/2019 | Shalev-Shwartz | G05D 1/0231 |
| 2020/0218979 | A1* | 7/2020 | Kwon | B60W 60/0011 |
| 2020/0269843 | A1* | 8/2020 | Wissing | B60W 50/0098 |
| 2020/0361471 | A1* | 11/2020 | Choi | B60W 30/18163 |
| 2020/0384996 | A1* | 12/2020 | Mahajan | B60W 30/143 |
| 2020/0391738 | A1* | 12/2020 | Isele | G08G 1/167 |

OTHER PUBLICATIONS

Ribeiro Gaussian Probability Density Functions: Properties and Error Characterization (Year: 2004).*

H. Bai, S. Cai, N. Ye, D. Hsu, and W. S. Lee, "Intention-aware online pomdp planning for autonomous driving in a crowd," in Robotics and Automation (ICRA), 2015 IEEE International Conference on. IEEE, 2015, pp. 454-460.

M. Bouton, A. Cosgun, and M. J. Kochenderfer, "Belief state planning for navigating urban intersections," IEEE Intelligent Vehicles Symposium (IV), 2017.

S. Brechtel, T. Gindele, and R. Dillmann, "Probabilistic decision-making under uncertainty for autonomous driving using continuous pomdps," in Intelligent Transportation Systems (ITSC), 2014 IEEE 17th International Conference on. IEEE, 2014, pp. 392-399.

W. Brilon, R. Koenig, and R. J. Troutbeck, "Useful estimation procedures for critical gaps," Transportation Research Part A: Policy and Practice, vol. 33, No. 3-4, pp. 161-186, 1999.

C. B. Browne, E. Powley, D. Whitehouse, S. M. Lucas, P. I. Cowling, P. Rohlfshagen, S. Tavener, D. Perez, S. Samothrakis, and S. Colton, "A survey of monte carlo tree search methods," IEEE Transactions on Computational Intelligence and AI in games, vol. 4, No. 1, pp. 1-43, 2012.

N. Bulling, "A survey of multi-agent decision making," KI-Künstliche Intelligenz, vol. 28, No. 3, pp. 147-158, 2014.

C. F. Camerer, T.-H. Ho, and J.-K. Chong, "A cognitive hierarchy model of games," The Quarterly Journal of Economics, vol. 119, No. 3, pp. 861-898, 2004.

J. N. Foerster, G. Farquhar, T. Afouras, N. Nardelli, and S. Whiteson, "Counterfactual multi-agent policy gradients," in Thirty-Second AAAI Conference on Artificial Intelligence, 2018.

P. J. Gmytrasiewicz and P. Doshi, "A framework for sequential planning in multi-agent settings," Journal of Artificial Intelligence Research, vol. 24, pp. 49-79, 2005.

A. Goldhoorn, A. Garrell, R. Alquézar, and A. Sanfeliu, "Continuous real time pomcp to find-and-follow people by a humanoid service robot," in Humanoid Robots (Humanoids), 2014 14th IEEE—RAS International Conference on. IEEE, 2014, pp. 741-747.

J. Hillenbrand, A. M. Spieker, and K. Kroschel, "A multilevel collision mitigation approaches situation assessment, decision making, and performance tradeoffs," IEEE Transactions on Intelligent Transportation Systems, vol. 7, pp. 528-540, 2006.

T. N. Hoang and K. H. Low, "Interactive pomdp lite: Towards practical planning to predict and exploit intentions for interacting with self-interested agents." in IJCAI, 2013, pp. 2298-2305.

D. Isele and A. Cosgun, "Transferring autonomous driving knowledge on simulated and real intersections," International Conference on Machine Learning Workshop (ICML-WS), 2017.

D. Isele, A. Nakhaei, and K. Fujimura, "Safe reinforcement learning on autonomous vehicles," in IEEE/RSJ International Conference on Intelligent Robots and Systems (IROS) IEEE, 2018, pp. 1-6.

D. E. Knuth and R. W. Moore, "An analysis of alpha-beta pruning," Artificial intelligence, vol. 6, No. 4, pp. 293-326, 1975.

J. Kong, M. Pfeiffer, G. Schildbach, and F. Borrelli, "Kinematic and dynamic vehicle models for autonomous driving control design," in 2015 IEEE Intelligent Vehicles Symposium (IV). IEEE, 2015, pp. 1094-1099.

M. Lanctot, V. Zambaldi, A. Gruslys, A. Lazaridou, K. Tuyls, J. Pérolat, D. Silver, and T. Graepel, "A unified game-theoretic approach to multiagent reinforcement learning," in Advances in Neural Information Processing Systems, 2017, pp. 4190-4203.

S. Lefèvre, D. Vasquez, and C. Laugier, "A survey on motion prediction and risk assessment for intelligent vehicles," ROBOMECH journal, vol. 1, No. 1, p. 1, 2014.

M. L. Littman, "Markov games as a framework for multiagent reinforcement learning," in Machine learning proceedings 1994. Elsevier, 1994, pp. 157-163.

R. Lowe, Y. Wu, A. Tamar, J. Harb, O. P. Abbeel, and I. Mordatch, "Multi-agent actor-critic for mixed cooperative-competitive environments," in Advances in Neural Information Processing Systems, 2017, pp. 6379-6390.

F. S. Melo and M. Veloso, "Decentralized mdps with sparse interactions," Artificial Intelligence, vol. 175, No. 11, pp. 1757-1789, 2011.

A. Mohseni-Kabir, D. Isele, and K. Fujimura, "Interaction-aware multi-agent reinforcement learning for mobile agents with individual goals," IEEE International Conference on Robotics and Automation (ICRA), 2019.

L. S. Shapley, "Stochastic games," Proceedings of the national academy of sciences, vol. 39, No. 10, pp. 1095-1100, 1953.

D. Silver and J. Veness, "Monte-carlo planning in large pomdps," in Advances in neural information processing systems, 2010, pp. 2164-2172.

A. Tamke, T. Dang, and G. Breuel, "A flexible method for criticality assessment in driver assistance systems," in 2011 IEEE Intelligent Vehicles Symposium (IV). IEEE, 2011, pp. 697-702.

R. Tian, S. Li, N. Li, I. Kolmanovsky, A. Girard, and Y. Yildiz, "Adaptive game-theoretic decision making for autonomous vehicle control at roundabouts," in 2018 IEEE Conference on Decision and Control (CDC). IEEE, 2018, pp. 321-326.

J. Tobin, R. Fong, A. Ray, J. Schneider, W. Zaremba, and P. Abbeel, "Domain randomization for transferring deep neural networks from simulation to the real world," in 2017 IEEE/RSJ International Con-ference on Intelligent Robots and Systems (IROS). IEEE, 2017, pp. 23-30.

M. Treiber, A. Hennecke, and D. Helbing, "Congested traffic states in empirical observations and microscopic simulations," Physical Review E, vol. 62, No. 2, p. 1805, 2000.

S. Ulbrich and M. Maurer, "Probabilistic online pomdp decision making for lane changes in fully automated driving," in 16th International IEEE Conference on Intelligent Transportation Systems (ITSC 2013). IEEE, 2013, pp. 2063-2067.

J. Wei, J. M. Dolan, and B. Litkouhi, "Autonomous vehicle social behavior for highway entrance ramp management," in Intelligent Vehicles Symposium (IV), 2013 IEEE. IEEE, 2013, pp. 201-207.

* cited by examiner

AUTONOMOUS VEHICLE INTERACTIVE DECISION MAKING

BACKGROUND

It may be difficult to train an autonomous vehicle to drive itself, especially because it may be difficult to reason about surrounding traffic's behavior. For example, traffic participants may not necessarily be purely adversarial, nor purely cooperative. In this regard, popular algorithms may fail to train the autonomous vehicle in an efficient manner. For example, if an autonomous vehicle waits for an opening or a gap in busy traffic during rush hour, existing techniques may result in the autonomous vehicle waiting indefinitely.

BRIEF DESCRIPTION

According to one aspect, a system for autonomous vehicle interactive decision making may include a sensor, an action predictor, an intention predictor, a model updater, and an autonomous action selector. The sensor may identify two or more traffic participants within a same lane and one or more gaps between the two or more traffic participants. The action predictor may select a gap from one or more of the gaps and identify a traffic participant from the two or more traffic participants associated with the selected gap based on a coarse probability of a successful merge between the autonomous vehicle and a corresponding traffic participant. The intention predictor may generate an intention prediction associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle. The intention predictor may generate an intention prediction associated with the autonomous vehicle. The model updater may calculate an updated probability of a successful interaction between the identified traffic participant and the autonomous vehicle based on the intention prediction associated with the identified traffic participant and the intention prediction associated with the autonomous vehicle. The autonomous action selector may implement the maneuver based on the updated probability of the successful interaction between the identified traffic participant and the autonomous vehicle.

The action predictor may calculate the coarse probability of the successful merge between the autonomous vehicle and the corresponding traffic participant of the two or more traffic participants for each of the one or more gaps. The coarse probability of the successful merge may be calculated based on an estimated willingness to yield of the corresponding traffic participant associated with each of the one or more gaps, a size of a corresponding gap, and a distance between the corresponding gap and a current position of the autonomous vehicle. The intention predictor may generate the intention prediction associated with the identified traffic participant based on continuity associated with the identified traffic participant. Continuity may be a likelihood of the identified traffic participant continuing a current course of action. The intention predictor may generate the intention prediction associated with the identified traffic participant based on influencibility associated with the identified traffic participant. Influencibility may be a likelihood of the identified traffic participant changing a current course of action based on a state of the autonomous vehicle.

The coarse probability of the successful merge m may be represented by $$P(m \mid y, d, g) \propto \frac{P(m \mid y) P(m \mid d) P(m \mid g)}{P(m)}.$$

P(m|y) may be a personality model which governs an estimated willingness to yield y of the corresponding traffic participant associated with each of the one or more gaps, a size of a corresponding gap g, and a distance d between the corresponding gap and a current position of the autonomous vehicle. Additionally, $$P(m \mid d) \propto \exp\left(-\frac{(d - d_0)^2}{\sigma^2}\right).$$

According to one aspect, a method for autonomous vehicle interactive decision making may include identifying two or more traffic participants within a same lane and one or more gaps between the two or more traffic participants, selecting a gap from one or more of the gaps and identifying a traffic participant from the two or more traffic participants associated with the selected gap based on a coarse probability of a successful merge between the autonomous vehicle and a corresponding traffic participant, generating an intention prediction associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle, generating an intention prediction associated with the autonomous vehicle, calculating an updated probability of a successful interaction between the identified traffic participant and the autonomous vehicle based on the intention prediction associated with the identified traffic participant and the intention prediction associated with the autonomous vehicle, and implementing the maneuver based on the updated probability of the successful interaction between the identified traffic participant and the autonomous vehicle.

The method for autonomous vehicle interactive decision making may include calculating the coarse probability of the successful merge between the autonomous vehicle and the corresponding traffic participant of the two or more traffic participants for each of the one or more gaps. The coarse probability of the successful merge may be calculated based on an estimated willingness to yield of the corresponding traffic participant associated with each of the one or more gaps, a size of a corresponding gap, and a distance between the corresponding gap and a current position of the autonomous vehicle. The method for autonomous vehicle interactive decision making may include generating the intention prediction associated with the identified traffic participant based on continuity associated with the identified traffic participant. Continuity may be a likelihood of the identified traffic participant continuing a current course of action. The method for autonomous vehicle interactive decision making may include generating the intention prediction associated with the identified traffic participant based on influencibility associated with the identified traffic participant. Influencibility may be a likelihood of the identified traffic participant changing a current course of action based on a state of the autonomous vehicle.

The coarse probability of the successful merge m may be represented by $$P(m \mid y, d, g) \propto \frac{P(m \mid y) P(m \mid d) P(m \mid g)}{P(m)}.$$

P(m|y) may be a personality model which governs an estimated willingness to yield y of the corresponding traffic participant associated with each of the one or more gaps, a size of a corresponding gap g, and a distance d between the corresponding gap and a current position of the autonomous vehicle.

Additionally, $$P(m \mid d) \propto \exp\left(-\frac{(d - d_0)^2}{\sigma^2}\right).$$

According to one aspect, a system for autonomous vehicle interactive decision making may include a sensor, an action predictor, an intention predictor, a model updater, and an autonomous action selector. The sensor may identify two or more traffic participants within a same lane and one or more gaps between the two or more traffic participants. The action predictor may select a gap from one or more of the gaps and identify a traffic participant from the two or more traffic participants associated with the selected gap based on a coarse probability of a successful merge between the autonomous vehicle and a corresponding traffic participant. The intention predictor may generate an intention prediction associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle. The intention predictor may generate an intention prediction associated with the autonomous vehicle. The model updater may calculate an updated probability of a successful interaction between the identified traffic participant and the autonomous vehicle based on the intention prediction associated with the identified traffic participant, the intention prediction associated with the autonomous vehicle, and an observation of whether the identified traffic participant is yielding to the autonomous vehicle. The autonomous action selector may implement the maneuver based on the updated probability of the successful interaction between the identified traffic participant and the autonomous vehicle.

The action predictor may calculate the coarse probability of the successful merge between the autonomous vehicle and the corresponding traffic participant of the two or more traffic participants for each of the one or more gaps. The coarse probability of the successful merge may be calculated based on an estimated willingness to yield of the corresponding traffic participant associated with each of the one or more gaps, a size of a corresponding gap, and a distance between the corresponding gap and a current position of the autonomous vehicle. The intention predictor may generate the intention prediction associated with the identified traffic participant based on continuity associated with the identified traffic participant. Continuity may be a likelihood of the identified traffic participant continuing a current course of action. The intention predictor may generate the intention prediction associated with the identified traffic participant based on influencibility associated with the identified traffic participant. Influencibility may be a likelihood of the identified traffic participant changing a current course of action based on a state of the autonomous vehicle. The maneuver creating the interaction between the identified traffic participant and the autonomous vehicle may be the autonomous vehicle merging into the same lane as the identified traffic participant.

DETAILED DESCRIPTION

Figure 1:
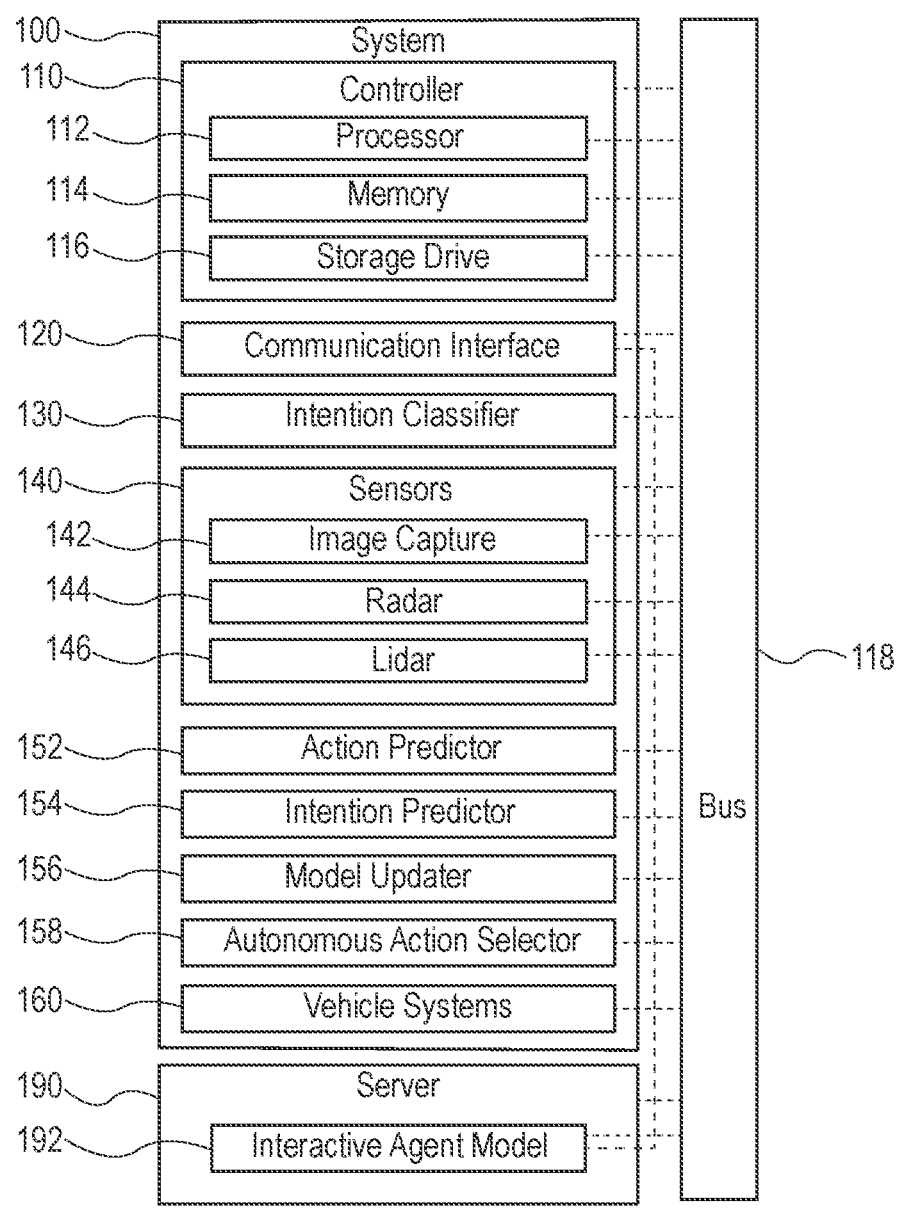
FIG. 1 is a component diagram of a system for autonomous vehicle interactive decision making, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

As described herein, subscript/superscript notation variable$_{time}^{agent,action}$ may be utilized (i.e., a superscript may be agent or action related and a subscript may be time related). In a stochastic game, at time t each agent i in state $s_t$ takes an action $a_t^i$ according to their policy $\pi^i$. All the agents then transition to the state $s_{t+1}$ and receive a reward $r_t^i$. Stochastic games can be described as a tuple (S, A, P, R) where S is the set of states, and $A=\{A^1, \ldots, A^n\}$ is the joint action space consisting of the set of each agent's actions, where n is the number of agents. The reward functions $R=\{R^1, \ldots, R^n\}$ describe the reward for each agent S×A→R. The transition function P:S×A×S→[0,1] describes how the state evolves in response to all the agents' collective actions. Stochastic games are an extension to Markov Decision Processes (MDPs) that generalize to multiple agents, each of which has its own policy and reward function. Nodes in a game tree represent states, the tree is rooted at the current state $s_0 \in S$, and a branch exists for every possible set of actions.

According to one aspect, an assumption that all vehicles or traffic participants have the same action space, and there is one ego vehicle (e.g., autonomous vehicle) and n−1 traffic participants, each layer of the game tree has $|A|^n=\times \ldots \times |A^n|$ branches may be made. For consistency of representation, this can also be likened to a game tree where players take turns by representing decisions of a single time step as an n layer tree with |A| branches per node. In this stacked representation, it may be understood that the n moves are carried out simultaneously. Finding the optimal action sequence for a fixed time horizon T may require taking the rewards associated with the leaf nodes and using dynamic programming to propagate up the tree and select the actions associated with the greatest expected return. Because the number of branches is exponential in the number of agents, brute force implementations to a horizon of depth T result in the doubly exponential runtime of $0 (|A|^{n^T})$. In autonomous driving, zero-sum planning strategies, like minimax search with alpha-beta pruning, are generally prohibitively cautious. It may be more accurate to model other agents as being self-interested (e.g., other traffic participants want to travel as fast as possible without crashing), but this does not allow for prediction of their actions (e.g., how much do they wish to avoid crashing, being kind, how big of a hurry they are in, etc.). So, to solve the game tree, probabilities may be utilized to model the expected behavior of other agents and look for ways to limit the branching while not assuming the expected behavior of other agents.

FIG. 1 is a component diagram of a system 100 for autonomous vehicle interactive decision making, according to one aspect. The system 100 for autonomous vehicle interactive decision making may include a controller 110, which may include a processor 112, a memory 114, and a storage drive 116. A bus 118 may communicatively couple components of the system 100 for autonomous vehicle interactive decision making. The system 100 for autonomous vehicle interactive decision making may include a communication interface 120, an intention classifier 130, and sensors 140. The sensors 140 may be image capture 142 sensors 140, radar 144, Lidar 146 (Light Detection and Ranging) sensors 140, etc. Additionally, the system 100 for autonomous vehicle interactive decision making may include an action predictor 152, an intention predictor 154, a model updater 156, an autonomous action selector 158, and one or more vehicle systems 160. The processor may be utilized to implement the action predictor 152, the intention predictor 154, the model updater 156, or the autonomous action selector 158.

The system 100 for autonomous vehicle interactive decision making may be in computer communication with a server 190 housing an interactive agent model 192 (e.g., personality model) via the communication interface 120. According to one aspect, the server 190 may be utilized to process or perform features associated with the action predictor 152, the intention predictor 154, the model updater 156, or the autonomous action selector 158.

The system 100 for autonomous vehicle interactive decision making may be designed to formulate autonomous vehicle interactive decision making as a game tree, simplified by selecting merely another traffic participant with which the autonomous vehicle may interact. In other words, formalizing the interactive decision-making process for the autonomous vehicle as a stochastic game.

Because game trees grow exponentially in both the number of players and actions, the system 100 for autonomous vehicle interactive decision making may limit the branching factor of both the controlled agent (e.g., the ego agent or the autonomous vehicle) and the other traffic participants. The system 100 for autonomous vehicle interactive decision making may select a gap or select a vehicle or traffic participant from a set of traffic participants and perform game tree analysis merely with respect to that selected traffic participant to facilitate determination of an autonomous driving maneuver. In this regard, the sensors 140 may identify two or more traffic participants within a same lane and one or more gaps between the two or more traffic participants.

The action predictor 152 may select a gap from one or more of the gaps and identify a traffic participant from the two or more traffic participants associated with the selected gap based on a coarse probability of a successful merge between the autonomous vehicle and a corresponding traffic participant. According to one aspect, the action predictor 152 may select the gap based on characteristics associated with the gap, such as geometric configuration between at least the identified traffic participant and the autonomous vehicle and/or additional traffic participants. The action predictor 152 may calculate the coarse probability of the successful merge between the autonomous vehicle and the corresponding traffic participant of the two or more traffic participants for each of the one or more gaps. Because merely a single gap and/or associated vehicle or traffic participant is selected, analysis may be performed in a forward prediction fashion, using a reduced game tree. In other words, the action predictor 152 may calculate the coarse probability of the successful merge based merely on one or more possible actions of the identified traffic participant and one or more possible actions of the autonomous vehicle. In this way, the intention predictor 154 and model updater 156, described in greater detail below, may be utilized to calculate probabilities and rewards associated with those various possible actions (i.e., of the identified traffic participant and of the autonomous vehicle) to determine the action or operating maneuver to be implemented by the autonomous action selector 158.

A coarse search (e.g., associated with coarse probability of the successful merge) enables breaking out of the local minima being trapped in from a greedy search. A prediction of traffic participant behaviors enables reasoning about which parts of the road are available and when. Typically these predictions may be represented as probability distributions to allow for variations in driver motions. Using the predictions of other agent (e.g., other traffic participants) motions, a set of safe intentions is generated, taking into account the possible different ways in which other agents may respond. Each trajectory may then be evaluated against several metrics (risk, efficiency, etc.) and a trajectory may be selected.

For example, sequences of actions may be condensed into intentions which follow a distribution. Additionally, by using intentions, the system may discretize the continuous action space. This reduces the depth of the search. Because running forward simulations for all possible ego (e.g., autonomous vehicle) actions and all possible combinations of other agents' (e.g., all traffic participants) actions is prohibitively expensive, it may be desirable to reduce the branching factor. To reduce the number of ego-agent actions, actions may be decomposed into a sub-goal selection task and a within-sub-goal set of actions. Sub-goal selection is done using a probabilistic tree search which does not require forward simulation. The smaller set of within-sub-goal intentions is then used for forward simulation.

To reduce the number of traffic participant actions, a target interactive agent may be selected and then non-interactive predictions may be assumed for the other traffic agents. The prediction set of other agents, including all possible intentions for the targeted interactive agent, are then compared against generated samples from the selected ego intention class.

In this way, the action predictor 152 may select or identify the identified traffic participant to mitigate game tree computation resources for the processor 112, the memory 114, and the storage drive 116 by targeting gaps between two traffic participants or vehicles. Stated another way, the system 100 for autonomous vehicle interactive decision making enables formulation of autonomous driving decisions as a game tree which may be handled using approximations which may include simplification by selection of a single gap and/or traffic participant and performing probability reasoning analysis thereon. Given a targeted or selected gap, the action predictor 152 may identify a single agent or traffic participant to attract with as well as sample from a limited set of possible actions associated with the identified traffic participant. Using this reduced space, the intention predictor 154 and the model updater 156 may generate intention predictor 154s or calculate updated probabilities. Therefore, the action predictor 152, by selecting the gap from among different gaps, may learn or analyze different gaps and/or traffic participants using online learning, for example.

According to one aspect, the coarse probability of the successful merge may be calculated based on an estimated willingness to yield of the corresponding traffic participant associated with each of the one or more gaps, a size of a corresponding gap, and a distance between the corresponding gap and a current position of the autonomous vehicle. Further, each one of these may be assumed to be independent of one another.

For example, the coarse probability of the successful merge m may be represented by:

$$P(m\mid y, d, g) \propto \frac{P(m\mid y)P(m\mid d)P(m\mid g)}{P(m)} \quad (1)$$

P(m|y) may be a personality model which governs an estimated willingness to yield y of the corresponding traffic participant associated with each of the one or more gaps, a size of a corresponding gap g, and a distance d between the corresponding gap and a current position of the autonomous vehicle. Effectively, the personality model P(m|y) may be utilized by the system 100 for autonomous vehicle interactive decision making to model other agents or traffic participants. The (m|d) term may represent how far the gap is from the autonomous vehicle. The distance d may be utilized as a proxy for time. The m|y term may represent the size of the gap. When a gap is larger, there may be a higher probability of success associated with the merging maneuver. The P(m|y) term may be associated with a probability that the identified traffic participant will yield. The P(m|y) term may be updated over time, based on observations associated with the identified traffic participant (e.g., whether the identified traffic participant backs off or yields or not at different points in time). To model the probability of successfully merging given distance P(m|d), a Gaussian may be utilized:

$$P(m\mid d) \propto \exp\left(-\frac{(d-d_0)^2}{\sigma^2}\right) \quad (2)$$

To compute the probability of successfully merging given gap size P(m|g) gap lengths may be normalized and then the normalized gap $g_{norm}$ is then transformed into a probability using a logistic:

$$P(m\mid g) = \frac{1}{1 + \exp(-kg_{norm})} \quad (3)$$

where k controls the steepness of the slope. When searching the coarse tree the probability of success without taking into account the specific motions the other agents may be considered. This simplifies the problem to a traditional tree search problem and enables use of higher level planning to avoid local optima. For example, there might be a large opening far away, which has the greatest probability of success, but if it fails, there may be no other options. A greedy search may target this gap, but Bellman equations may yield a lower probability option with numerous backup plans.

The intention predictor 154 may generate an intention prediction associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle. For example, the maneuver creating the interaction between the identified traffic participant and the autonomous vehicle may be the autonomous vehicle merging into the same lane as the identified traffic participant. The intention predictor 154 and model updater 156 may calculate probabilities which may be utilized to reason about self-interested agents (e.g., self-interested traffic participants), update those probabilities in an online fashion, and describe how the predicted behaviors of other agents (e.g., the other traffic participants) enable the autonomous action selector 158 to discretize, limit, and select the ego agent's (e.g., the autonomous vehicle) action space while enhancing safety in the event that less probable actions are taken by other traffic participants.

The intention predictor 154 may generate the intention prediction associated with the identified traffic participant based on continuity associated with the identified traffic participant. Continuity may be a likelihood of the identified traffic participant continuing a current course of action. Additionally, the intention predictor 154 may generate the intention prediction associated with the identified traffic participant based on influencibility associated with the identified traffic participant. Influencibility may be a likelihood of the identified traffic participant changing a current course of action based on a state of the autonomous vehicle. Additionally, the intention predictor 154 may generate an intention prediction associated with the autonomous vehicle.

Once a specific gap is targeted, a single agent (e.g., the identified traffic participant) can be identified with which the ego agent (e.g., the autonomous vehicle) needs to interact. This reduces the branching factor to the number of intentions that the selected agent has available. To predict the agent's intentions, a prediction based on vehicle dynamics and road geometry may be combined with an interactive prediction that looks at how behavior might change in response to ego agent intervention.

The first component may derive its predictions from kinematic models of the participants, for example, using constant velocity assumptions. For the second component, predicting behavior in the presence of multiple agent interactions using counterfactual reasoning may be considered. This looks at the predicted behavior in the absence of the ego agent (e.g., predicted behavior of the identified traffic participant in the absence of the autonomous vehicle), and then all the change that occurs is credited to the actions of the ego agent (e.g., predicted behavior of the identified traffic participant in the presence of the autonomous vehicle making a maneuver creating an interaction between the identified traffic participant and the autonomous vehicle).

While it is the case that a real driver may brake based on the behavior of a driver three cars ahead of his current position or may change lanes in spite of his neighbors to avoid a congestion spotted ahead, assuming a single agent as the cause of a behavior may be a useful approximation. For tractability, counterfactual reasoning may be followed. It may be assumed, at any given time, the agent (e.g., the autonomous vehicle) interacts with merely one other agent (e.g., the identified traffic participant). There may be multiple predictions for this agent based on the believed responses to the latest action associated with the autonomous vehicle. Given the Markov assumption:

$$P(a_t^v \mid a_{t-1}^v, a_{t-1}^e, s_t^v, s_t^e) \propto \frac{P(a_t^v \mid a_{t-1}^v, s_t^v) P(a_t^v \mid s_t^e)}{P(a_t^v)} \quad (4)$$

$P(a_t^v \mid a_{t-1}^v, a_t^v)$ may describe the probability of an agent's action based on its current state, including the continuity or how likely are they to continue doing what they were doing. This may correspond to predictions based on kinematics and road information. $P(a_t^v \mid S_t^e)$ describes the influencibility, or how likely the agent is to change its behavior based on the state of the ego agent. In this way, equation (4) relates to the behavior of the other traffic participants and assigned probabilities associated with those behaviors.

Given the set of predicted intentions, their corresponding probabilities, and the ego agent's targeted gap location, there exists a substantially reduced space of possible intentions from which the ego agent may choose. Each sampled intention has a corresponding risk (e.g., based on how close it gets to other vehicles), success (e.g., based on how likely it is to achieve its goal), and comfort value (e.g., based on the aggressiveness of the maneuvers). Since the ego agent does not have control over the other agent's intentions, it may weight expected returns based on the expected probability of the other agent's intentions. Importantly, to ensure a safe planning strategy, the ego agent may ensure that there is always a viable (although not necessarily optimal) response to the action the other agent may select. For example the ego agent may attempt to merge, hoping the other agent will yield. But the ego car's attempt may be such that it has an exit strategy (slowing down, and rerouting back to its lane) if the other agent does not yield. This reaction time may be referred to as the Time-to-Reaction (TTR) and this sets a lower bound on a planning horizon. To fully consider the costs of rerouting, a game tree may be used. This takes into account all the rerouting actions required to handle the various predictions. In practice, the coarse tree was sufficient for long term planning and only one intention depth needed to be considered for the fine-grained search. This reduces the second tree to a matrix game.

The stochastic game formulation allows for a single scalar valued reward. However there are numerous values associated with a single trajectory, i.e. risk, success, and comfort. These values are not directly comparable so the most appropriate way to discuss optimality may be to consider only values that lie along the Pareto frontier. A user preference can then be used to disambiguate values on the frontier. Additionally, there may be ambiguity related to the success value. This can simply be how close to a desired goal, or it can incorporate the likelihood that the ego intention elicits a favorable reaction. If probabilities of the other agent are known, the game tree propagation may address the latter. The reward may be given after the coarse search, and may be propagated up. Based on that reward, an action or maneuver may be selected.

The model updater 156 may calculate an updated probability of a successful interaction between the identified traffic participant and the autonomous vehicle based on the intention prediction associated with the identified traffic participant and the intention prediction associated with the autonomous vehicle. The model updater 156 may calculate the updated probability of the successful interaction between the identified traffic participant and the autonomous vehicle based on an observation of whether the identified traffic participant is yielding to the autonomous vehicle. The (updated) probability of the successful interaction between the identified traffic participant and the autonomous vehicle may be indicative of a likelihood of success that the autonomous vehicle may merge in front of the identified traffic participant and may be based on the geometric configuration associated with the gap and a likelihood of a collision between the identified traffic participant and the autonomous vehicle.

In this regard, after the ego agent has acted, the system may be able to observe the other traffic participants behaviors and use this to update the probabilities described in II-C concerning whether negotiating with the agent will result in success. The probability of successfully merging given yielding $P(m|y)$ may be updated using a difference equation:

$$P(m|Y)_t = aP(m|Y)_{t-1} + (1-a)\sigma_t \quad (5)$$

where $\sigma$ may be an observation of whether the vehicle or traffic participant is observed to be yielding or not, and $\alpha$ is a constant which sets the update rate. In this way, the probability of successfully merging given yielding $P(m|y)$ may be indicative of whether a driver is more cooperative or not and/or is willing to let the autonomous vehicle merge into his or her lane.

The autonomous action selector 158 may implement the maneuver based on the updated probability of the successful interaction between the identified traffic participant and the autonomous vehicle. In this way, inputs to the system 100 for autonomous vehicle interactive decision making may include attributes associated with the autonomous vehicle and attributes associated with the identified traffic participant (e.g., position, acceleration, velocity, assumptions associated with the identified traffic participant, such as intention prediction, predicted behavior, etc.). The maneuver may be associated with a desired trajectory for the autonomous vehicle based on the surrounding traffic participants.

Figure 4:
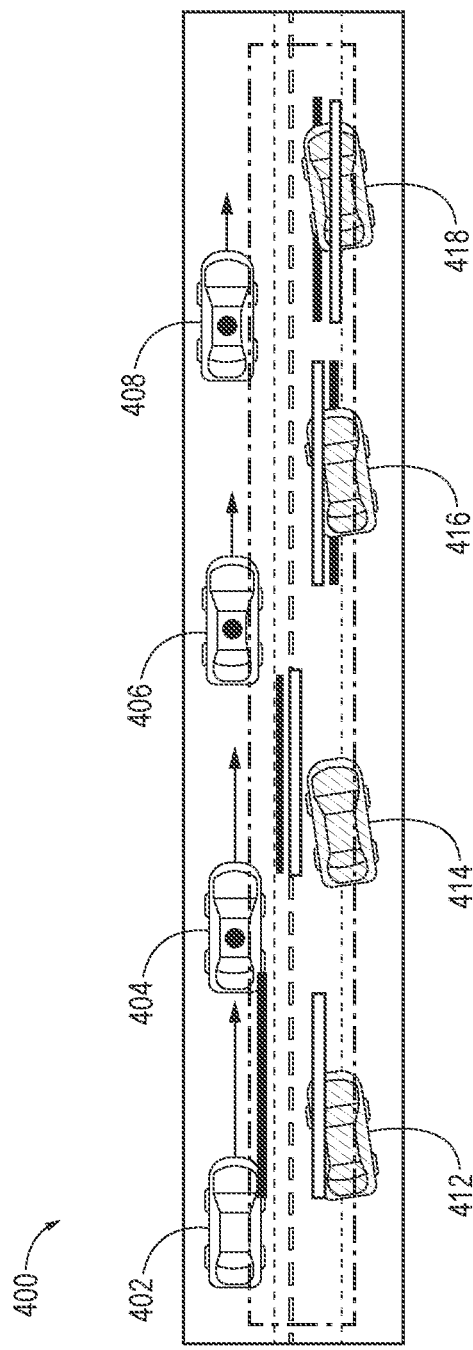
FIG. 4 is an exemplary scenario where the system for autonomous vehicle interactive decision making of FIG. 1 may be implemented, according to one aspect.

According to one aspect, under non-merge conditions and within a simulation, traffic participants may be modelled according to an intelligent driver model (IDM). When the ego car is aligned between two traffic participants in the traveling direction, the rear car may change its behavior as a result of the ego car's actions. The way the traffic car behaves is based on two randomized thresholds that govern the agent's behavior. One threshold governs whether or not the agent reacts to the ego car, the second threshold determines how the agent reacts. FIG. 4 illustrates how different thresholds produce different behaviors in response to an ego car in the same relative position. This process can be viewed as a rule-based variant of negotiation strategies: an agent proposes he go first by making it more dangerous for the other, the other agent accepts by backing off.

Figure 2:
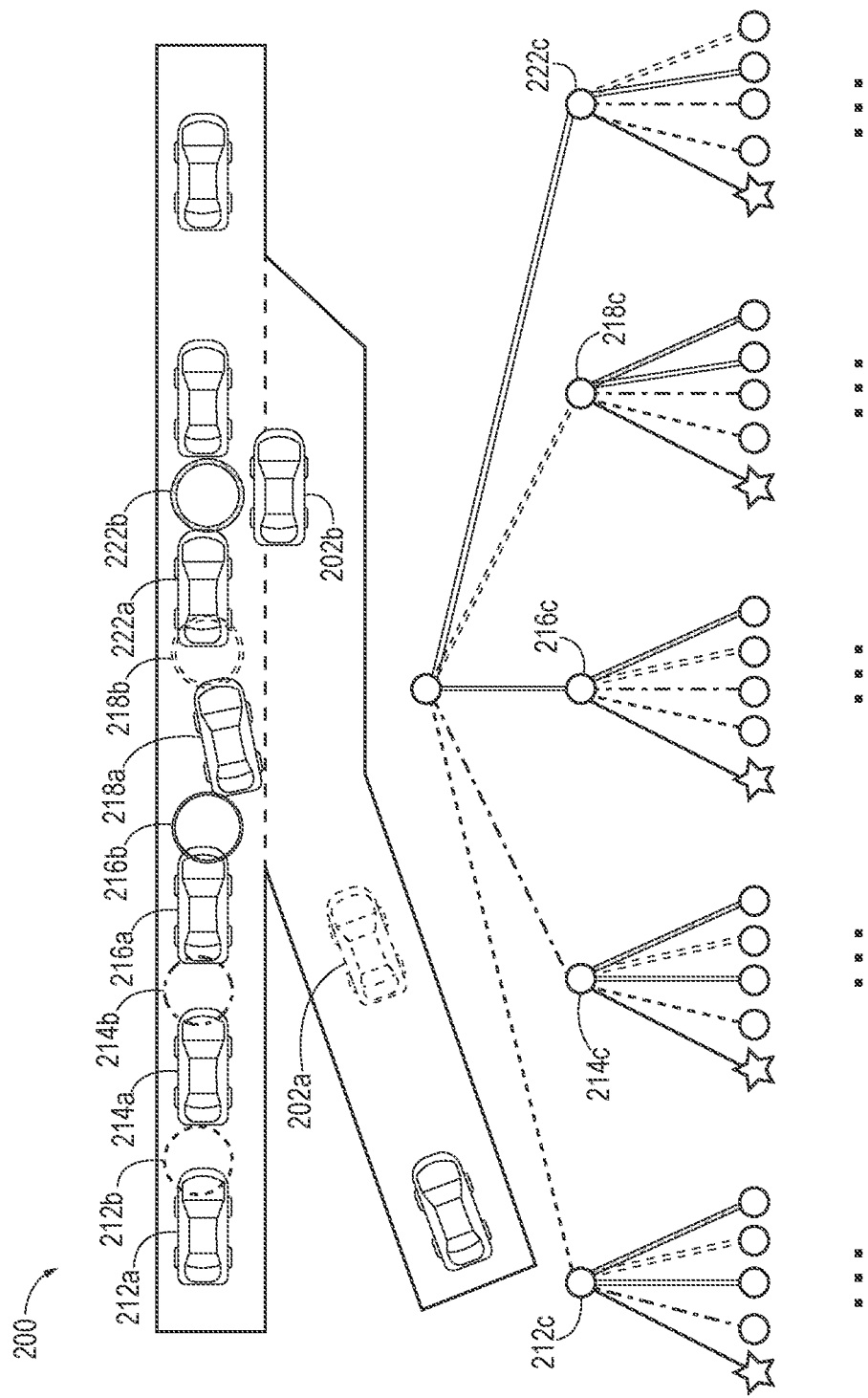
FIG. 2 is an exemplary scenario where the system for autonomous vehicle interactive decision making of FIG. 1 may be implemented, according to one aspect.

FIG. 2 is an exemplary scenario 200 where the system 100 for autonomous vehicle interactive decision making of FIG. 1 may be implemented, according to one aspect. In FIG. 2, gaps 212b, 214b, 216b, 218b, 222b may be identified by the sensor. Additionally, vehicles 212a, 214a, 216a, 218a, 222a may be associated with the identified gaps 212b, 214b, 216b, 218b, 222b. Nodes 212c, 214c, 216c, 218c, 222c correspond to vehicles 212a, 214a, 216a, 218a, 222 and associated gaps 212b, 214b, 216b, 218b, 222b. The system 100 for autonomous vehicle interactive decision making may analyze possible actions the corresponding vehicles 212a, 214a, 216a, 218a, 222 may take and determine a likelihood of success for a merge action or maneuver, taking into consideration merely a single interaction with a single identified traffic participant vehicle (e.g., vehicles 212a, 214a, 216a, 218a, 222) at a time. The stars may represent a successful merge or maneuver and the search (e.g., coarse search) may continue at a fixed depth or end when gaps 212b, 214b, 216b, 218b, 222b have been considered or analyzed by the action predictor 152.

Figure 3:
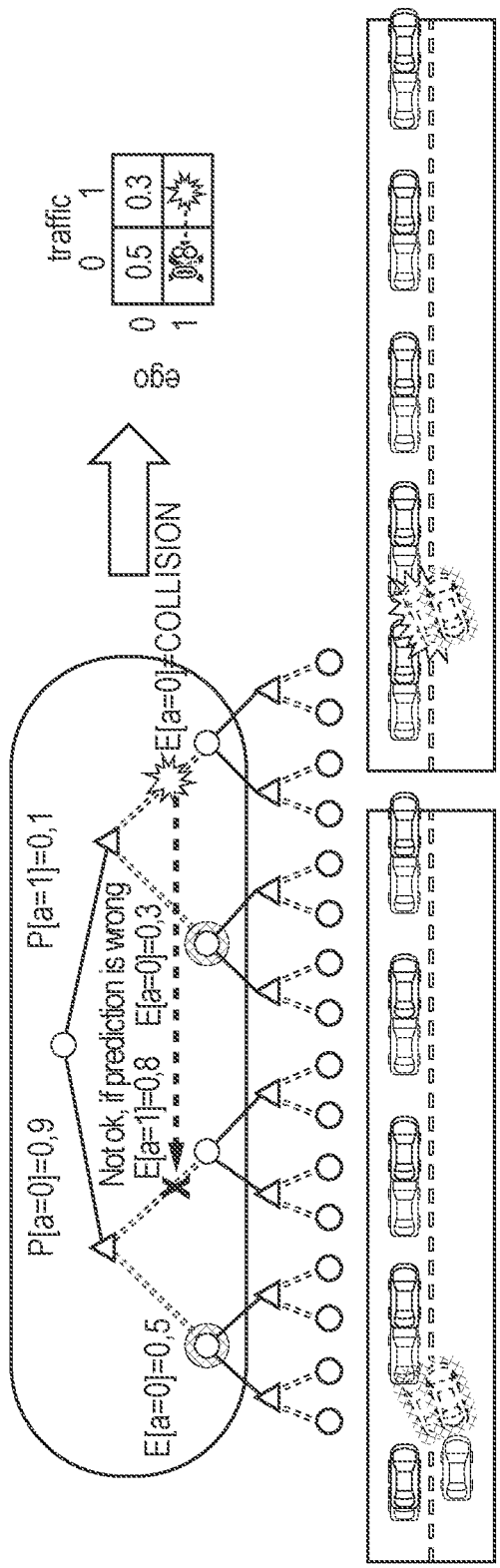
FIG. 3 is an exemplary scenario where the system for autonomous vehicle interactive decision making of FIG. 1 may be implemented, according to one aspect.

FIG. 3 is an exemplary scenario where the system 100 for autonomous vehicle interactive decision making of FIG. 1 may be implemented, according to one aspect. In FIG. 3, triangles may indicate ego agent (e.g., autonomous vehicle) intentions, and circles may indicate intentions of the agent (e.g., other traffic participant) being interacted with. While the more aggressive ego intention (a=1) may give a greater reward in the probable case that the traffic car brakes, if the traffic participant does not brake, a collision may occur, so these actions may be pruned or removed. The actions at each level of the game tree (e.g., corresponding to the grey oval) are equivalent to matrix game.

FIG. 4 is an exemplary scenario 400 where the system 100 for autonomous vehicle interactive decision making of FIG. 1 may be implemented, according to one aspect. FIG. 4 illustrates how four vehicles 402, 404, 406, 408 with different thresholds may respond to an agent (e.g., the autonomous vehicle) in a same relative position with different behavior. The solid line indicates a lateral position at which the traffic participant begins to react to the ego car or autonomous vehicle 412, 414, 416, 418. The white line indicates when the traffic participant yields to let the ego car merge. The dashed regions indicate the distributions from which the thresholds are sampled. If the traffic participant is reacting but not yet yielding, it may be considered to exhibit aggressive behavior (e.g., moving forward to block the other agent from merging). The first vehicle 402 is associated a reaction where the driver accelerates to block the merge. The second traffic participant 404 does not yet react to the ego car, continuing to drive as usual. The third traffic participant 406 yields to the ego car. The fourth traffic participant 408 had been moving to block the ego car at first, but then decided to back off and let the ego car merge.

Figure 5:
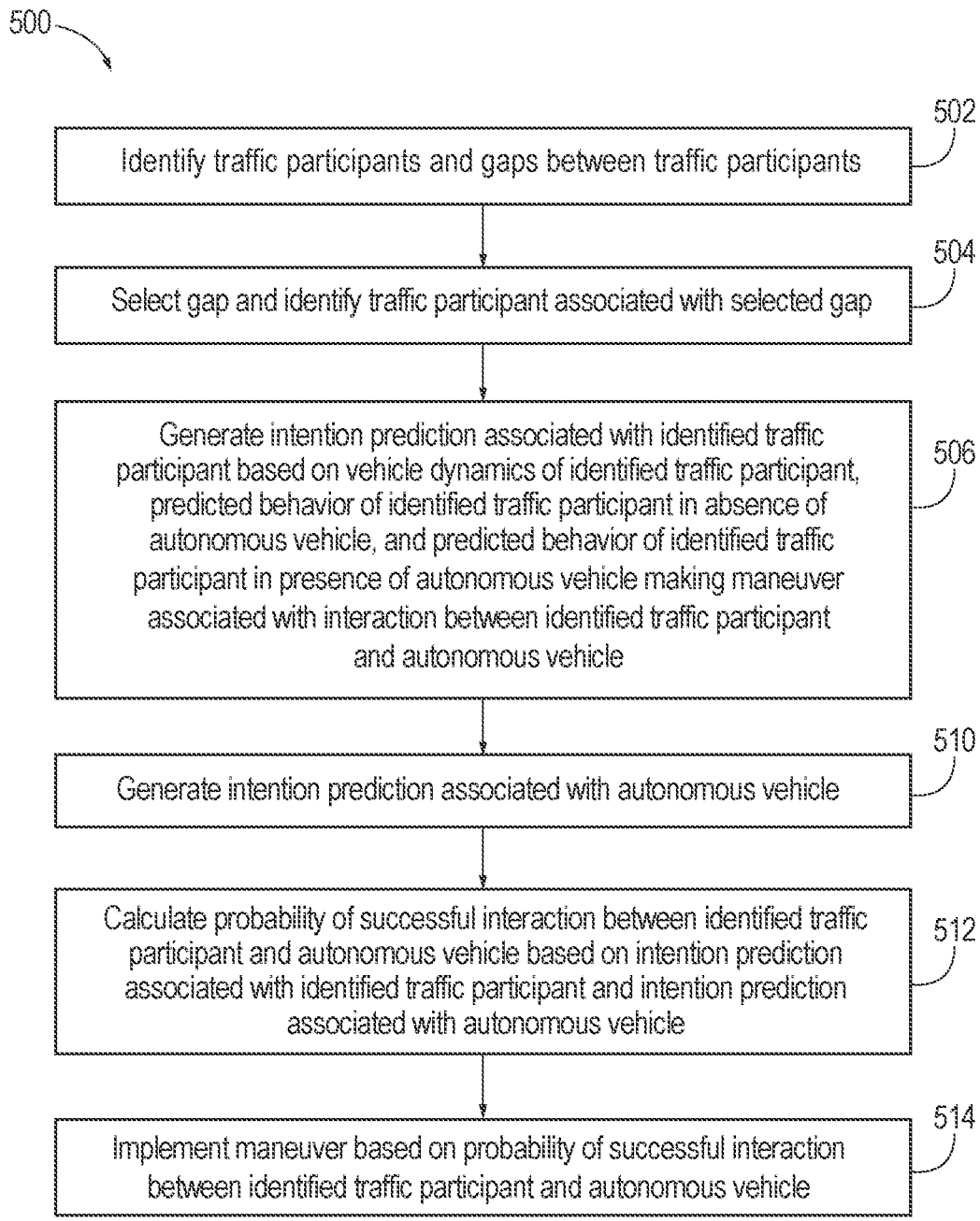
FIG. 5 is a flow diagram of a method for autonomous vehicle interactive decision making, according to one aspect.

FIG. 5 is a flow diagram of a method 500 for autonomous vehicle interactive decision making, according to one aspect. The method 500 may include identifying 502 two or more traffic participants within a same lane and one or more gaps between the two or more traffic participants, selecting 504 a gap from one or more of the gaps and identifying a traffic participant from the two or more traffic participants associated with the selected gap based on a coarse probability of a successful merge between the autonomous vehicle and a corresponding traffic participant, generating 506 an intention prediction associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle, generating 510 an intention prediction associated with the autonomous vehicle, calculating 512 an updated probability of a successful interaction between the identified traffic participant and the autonomous vehicle based on the intention prediction associated with the identified traffic participant and the intention prediction associated with the autonomous vehicle, and implementing 514 the maneuver based on the updated probability of the successful interaction between the identified traffic participant and the autonomous vehicle.

According to one aspect, selecting 504 the gap and generating 506 the intention prediction may include selecting an intention class based on a coarse search. Selecting 504 the gap may include identifying the traffic participant as the interactive traffic participant. Generating 506, 510 the intention prediction may include predicting the intentions of the other traffic participants and the intentions of the ego vehicle or the autonomous vehicle (e.g., based on a destination associated with navigation). The implementing 514 the maneuver may include acting, observing, and updating the probability models.

Figure 6:
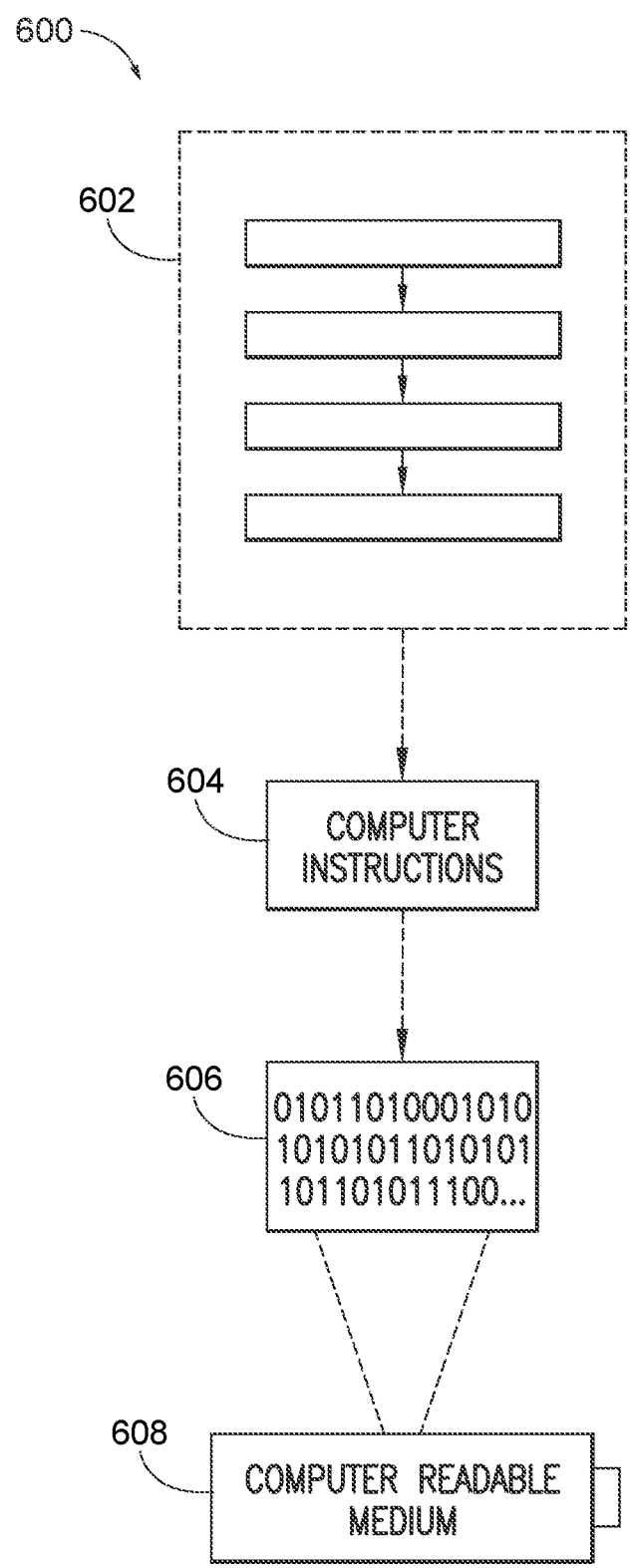
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, among others, on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 500 of FIG. 5. In another aspect, the processor-executable computer instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
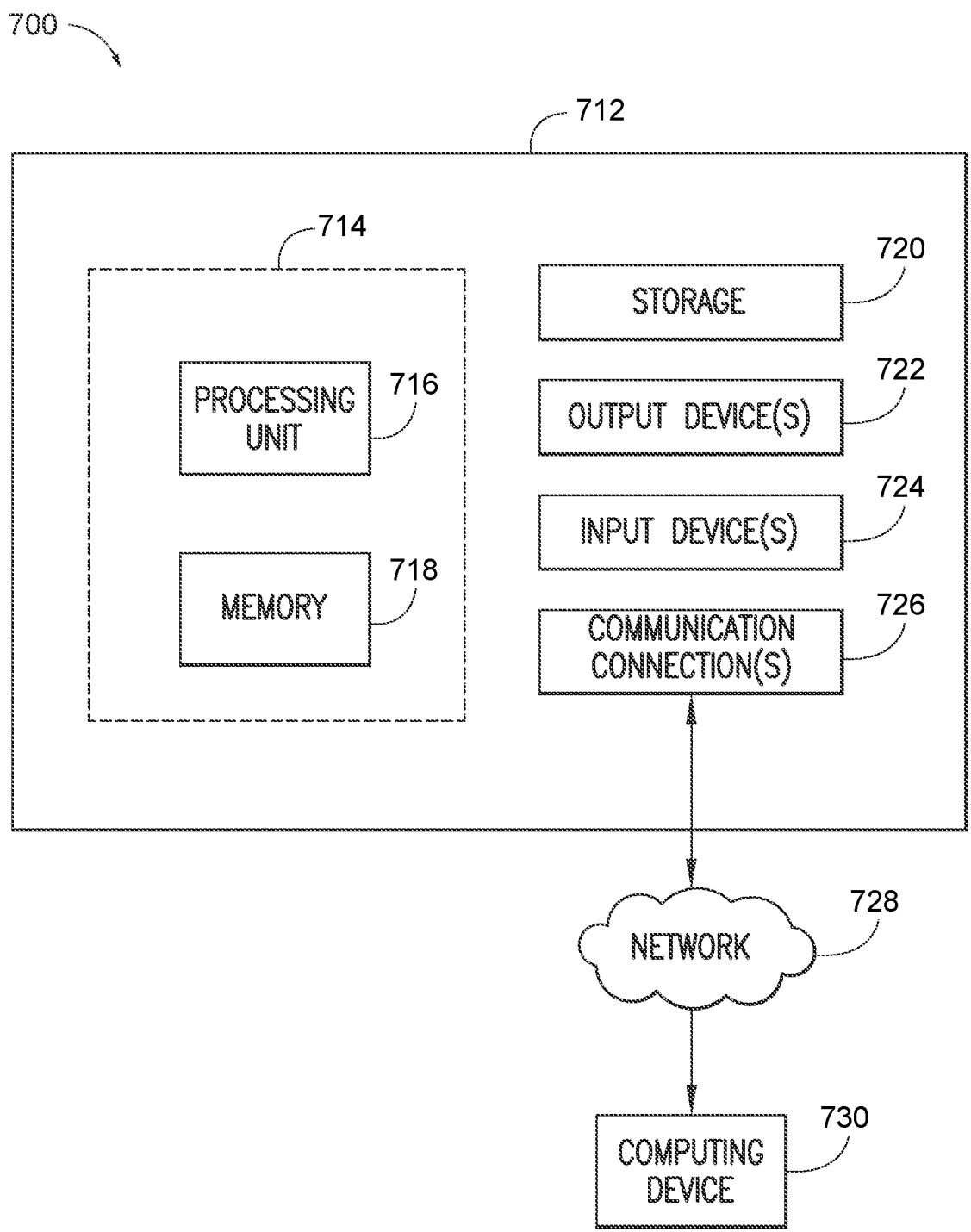
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, among others.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, or a combination thereof. This configuration is illustrated in FIG. 7 by dashed line 714.

In other aspects, the computing device 712 includes additional features or functionality. For example, the computing device 712 may include additional storage such as removable storage or non-removable storage, including magnetic storage, optical storage, among others. Such additional storage is illustrated in FIG. 7 by storage 720. In one aspect, computer readable instructions to implement one aspect provided herein are in storage 720. Storage 720 may store other computer readable instructions to implement an operating system, an application program, among others. Computer readable instructions may be loaded in memory 718 for execution by processing unit 716, for example.

The term "computer readable media" as used herein includes computer storage media. Computer storage media includes volatile and non-volatile, removable and non-removable media implemented in any method or technology for storage of information such as computer readable instructions or other data. Memory 718 and storage 720 are examples of computer storage media. Computer storage media includes RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names for features, elements, items, etc. For example, a first channel and a second channel generally correspond to channel A and channel B or two different or two identical channels or the same channel. Additionally, "comprising", "comprises", "including", "includes", or the like means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for autonomous vehicle interactive decision making, comprising:
 a sensor identifying three or more traffic participants within a same lane and two or more gaps between the three or more traffic participants;
 an action predictor, implemented via a processor, selecting a gap from two or more of the gaps via a first coarse tree search and identifying a traffic participant from the three or more traffic participants associated with the selected gap based on calculating a coarse probability of a successful merge for the autonomous vehicle at each one of the two or more gaps;
 an intention predictor, implemented via the processor, generating an intention prediction, via a second tree search, associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle;

wherein the intention predictor generates an intention prediction associated with the autonomous vehicle;

a model updater, implemented via the processor, calculating an updated probability of a successful merge between the identified traffic participant and the autonomous vehicle based on the intention prediction associated with the identified traffic participant and the intention prediction associated with the autonomous vehicle only for the vehicles associated with the selected gap; and an autonomous action selector, implemented via the processor, implementing the maneuver based on the updated probability of the successful interaction between the identified traffic participant and the autonomous vehicle, wherein the action predictor calculates the coarse probability of the successful merge between the autonomous vehicle and the corresponding traffic participant of the three or more traffic participants for each of the two or more gaps, and wherein the coarse probability of the successful merge is calculated based on an estimated willingness to yield of the corresponding traffic participant associated with each of the two or more gaps, a size of a corresponding gap, and a distance between the corresponding gap and a current position of the autonomous vehicle.

2. The system for autonomous vehicle interactive decision making of claim 1, wherein the intention predictor generates the intention prediction associated with the identified traffic participant based on continuity associated with the identified traffic participant, wherein continuity is a likelihood of the identified traffic participant continuing a current course of action.

3. The system for autonomous vehicle interactive decision making of claim 1, wherein the intention predictor generates the intention prediction associated with the identified traffic participant based on influencibility associated with the identified traffic participant, wherein influencibility is a likelihood of the identified traffic participant changing a current course of action based on a state of the autonomous vehicle.

4. The system for autonomous vehicle interactive decision making of claim 1, wherein the coarse probability of the successful merge m is represented by:

$$P(m \mid y, d, g) \propto \frac{P(m \mid y)P(m \mid d)P(m \mid g)}{P(m)},$$

wherein P(m|y) is a personality model which governs an estimated willingness to yield y of the corresponding traffic participant associated with each of the two or more gaps, a size of a corresponding gap g, and a distance d between the corresponding gap and a current position of the autonomous vehicle, wherein P(m) is a non-zero value.

5. The system for autonomous vehicle interactive decision making of claim 4, wherein $$P(m \mid d) \propto \exp\left(-\frac{(d-d_0)^2}{\sigma^2}\right),$$

wherein $\sigma^2$ is a non-zero value and $\sigma$ is indicative of a standard deviation of measurement noise.

6. A method for autonomous vehicle interactive decision making, comprising:

identifying three or more traffic participants within a same lane and two or more gaps between the three or more traffic participants;

selecting a gap from two or more of the gaps via a first coarse tree search and identifying a traffic participant from the three or more traffic participants associated with the selected gap based on calculating a coarse probability of a successful merge for the autonomous vehicle at each one of the two or more gaps;

generating an intention prediction, via a second tree search, associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle;

generating an intention prediction associated with the autonomous vehicle;

calculating an updated probability of a successful merge between the identified traffic participant and the autonomous vehicle based on the intention prediction associated with the identified traffic participant and the intention prediction associated with the autonomous vehicle only for the vehicles associated with the selected gap;

implementing the maneuver based on the updated probability of the successful interaction between the identified traffic participant and the autonomous vehicle; and calculating the coarse probability of the successful merge between the autonomous vehicle and the corresponding traffic participant of the three or more traffic participants for each of the two or more gaps, wherein the coarse probability of the successful merge is calculated based on an estimated willingness to yield of the corresponding traffic participant associated with each of the two or more gaps, a size of a corresponding gap, and a distance between the corresponding gap and a current position of the autonomous vehicle.

7. The method for autonomous vehicle interactive decision making of claim 6, comprising generating the intention prediction associated with the identified traffic participant based on continuity associated with the identified traffic participant, wherein continuity is a likelihood of the identified traffic participant continuing a current course of action.

8. The method for autonomous vehicle interactive decision making of claim 6, comprising generating the intention prediction associated with the identified traffic participant based on influencibility associated with the identified traffic participant, wherein influencibility is a likelihood of the identified traffic participant changing a current course of action based on a state of the autonomous vehicle.

9. The method for autonomous vehicle interactive decision making of claim 6, wherein the coarse probability of the successful merge m is represented by:

$$P(m \mid y, d, g) \propto \frac{P(m \mid y)P(m \mid d)P(m \mid g)}{P(m)},$$

wherein P(m|y) is a personality model which governs an estimated willingness to yield y of the corresponding traffic participant associated with each of the two or more gaps, a size of a corresponding gap g, and a distance d between the corresponding gap and a current position of the autonomous vehicle, wherein P(m) is a non-zero value.

10. The method for autonomous vehicle interactive decision making of claim 9, wherein $$P(m|d) \propto \exp\left(-\frac{(d-d_0)^2}{\sigma^2}\right),$$

wherein $\sigma^2$ is a non-zero value and $\sigma$ is indicative of a standard deviation of measurement noise.

11. A system for autonomous vehicle interactive decision making, comprising:
a sensor identifying three or more traffic participants within a same lane and two or more gaps between the three or more traffic participants;
an action predictor, implemented via a processor, selecting a gap from two or more of the gaps via first a coarse tree search and identifying a traffic participant from the three or more traffic participants associated with the selected gap based on calculating a coarse probability of a successful merge for the autonomous vehicle at each one of the two or more gaps;
an intention predictor, implemented via the processor, generating an intention prediction, via a second tree search, associated with the identified traffic participant based on one or more vehicle dynamics of the identified traffic participant, predicted behavior of the identified traffic participant in the absence of the autonomous vehicle, and predicted behavior of the identified traffic participant in the presence of the autonomous vehicle making a maneuver creating an interaction between the identified traffic participant and the autonomous vehicle;
wherein the intention predictor generates an intention prediction associated with the autonomous vehicle;
a model updater, implemented via the processor, calculating an updated probability of a successful merge between the identified traffic participant and the autonomous vehicle based on the intention prediction associated with the identified traffic participant, the intention prediction associated with the autonomous vehicle, and an observation of whether the identified traffic participant is yielding to the autonomous vehicle only for the vehicles associated with the selected gap; and
an autonomous action selector, implemented via the processor, implementing the maneuver based on the updated probability of the successful interaction between the identified traffic participant and the autonomous vehicle,
wherein the action predictor calculates the coarse probability of the successful merge between the autonomous vehicle and the corresponding traffic participant of the three or more traffic participants for each of the two or more gaps, and
wherein the coarse probability of the successful merge is calculated based on an estimated willingness to yield of the corresponding traffic participant associated with each of the two or more gaps, a size of a corresponding gap, and a distance between the corresponding gap and a current position of the autonomous vehicle.

12. The system for autonomous vehicle interactive decision making of claim 11, wherein the intention predictor generates the intention prediction associated with the identified traffic participant based on continuity associated with the identified traffic participant, wherein continuity is a likelihood of the identified traffic participant continuing a current course of action.

13. The system for autonomous vehicle interactive decision making of claim 11, wherein the intention predictor generates the intention prediction associated with the identified traffic participant based on influencibility associated with the identified traffic participant, wherein influencibility is a likelihood of the identified traffic participant changing a current course of action based on a state of the autonomous vehicle.

14. The system for autonomous vehicle interactive decision making of claim 11, wherein the maneuver creating the interaction between the identified traffic participant and the autonomous vehicle is the autonomous vehicle merging into the same lane as the identified traffic participant.

* * * * *